United States Patent
Celik et al.

(10) Patent No.: US 7,128,775 B2
(45) Date of Patent: Oct. 31, 2006

(54) RADIAL BED FLOW DISTRIBUTOR FOR RADIAL PRESSURE ADSORBER VESSEL

(75) Inventors: Cem E. Celik, Tonawanda, NY (US); James Smolarek, Boston, NY (US)

(73) Assignee: Praxair Technology, Inc., Danbury, CT (US)

( * ) Notice: Subject to any disclaimer, the term of this patent is extended or adjusted under 35 U.S.C. 154(b) by 300 days.

(21) Appl. No.: 10/843,595

(22) Filed: May 12, 2004

(65) Prior Publication Data

US 2005/0252378 A1   Nov. 17, 2005

(51) Int. Cl.
*B01D 53/047* (2006.01)
(52) U.S. Cl. .............................. 95/96; 96/108; 96/121; 96/152; 55/418
(58) Field of Classification Search .................. 96/90, 96/96, 108, 121, 139, 152; 55/418
See application file for complete search history.

(56) References Cited

U.S. PATENT DOCUMENTS

| | | | |
|---|---|---|---|
| 3,926,595 A * | 12/1975 | Bockman .................... 55/302 |
| 4,374,094 A | 2/1983 | Farnham .................... 422/218 |
| 5,298,226 A | 3/1994 | Nowobilski ................. 422/171 |
| 5,716,427 A | 2/1998 | Andreani et al. ............. 95/99 |
| 5,759,242 A | 6/1998 | Smolarek et al. ............ 96/149 |
| 5,814,129 A | 9/1998 | Tentarelli ..................... 95/90 |
| 5,885,442 A * | 3/1999 | Lapunow et al. ........... 208/134 |
| 6,506,234 B1 | 1/2003 | Ackley et al. ................. 95/96 |

\* cited by examiner

*Primary Examiner*—Robert A. Hopkins
(74) *Attorney, Agent, or Firm*—Flora W. Feng

(57) ABSTRACT

The present invention is a pressure adsorber vessel that employs a radial adsorbent bed with a variable perforated flow distributor to provide an effective uniform fluid flow though the adsorbent bed.

22 Claims, 3 Drawing Sheets

RADIAL BED FLOW DISTRIBUTOR FOR RADIAL PRESSURE ADSORBER VESSEL

This invention relates to a vessel used in pressure swing adsorption (PSA), vacuum/pressure swing adsorption (VPSA) or TSA processes and, more particularly, to an improved radial bed vessel for use in these processes.

BACKGROUND OF THE ART

The VPSA and PSA processes employ a selective adsorbent to remove at least one component of a gas from a gas mixture. Both processes employ four basic process steps: adsorption, depressurization, purge and repressurization. PSA and VPSA processes are well known and are widely used to selectively separate air components, i.e. oxygen and nitrogen.

The design of the adsorber vessel is critical to efficient operation of an air separation system. Improvements in the design of the adsorber vessel contribute to lower power consumption, lower capital cost and increased plant capacity.

VPSA vessels are typically designed as axial flow adsorbers which have limited applicability when plant capacity requirements yield a vessel diameter larger than 4–5 meters, thereby exceeding economical shipment limits. This results in an expensive and difficult requirement to field assemble the axial flow vessels. Such large diameter vessels also have inherently large void volume percentages in the upper and lower head spaces, and present flow distribution difficulties as a result of the large cross-section. As a result, the economics of large scale VPSA systems (i.e., >80 tons per day) are compromised when axial flow, vessel designs are employed.

VPSA system operation is adversely affected by bed pressure drop and void volume within the vessel. Bed pressure drop represents a substantial source of inefficiency in a VPSA process. Large gas flows into and out of the adsorbers are required, due to the relatively low operating pressures and recovery of these systems. This large gas flow results in high superficial gas velocities across the bed, creating an unwanted pressure drop, and contributing to a loss in efficiency. Such bed pressure drop losses typically comprise 10–15% of the power consumption.

In an axial flow bed, if the adsorber bed cross-section is increased by enlarging the diameter and lowering the superficial velocity, larger adsorbent inventories are required. This increases capital cost in order to improve power consumption, resulting in little gain in overall economics.

Void spaces in an adsorption vessel also create losses in a VPSA system. The volume of gas left in a lower head space is pressurized and depressurized during the cycle, ultimately resulting in air blow-down losses. Similarly, the volume of gas left in an upper head space, which is enriched in oxygen after the product make step, is subsequently evacuated in the waste step and acts as an inefficient oxygen purge. This inefficient use of oxygen purge gas results in a lowering of the overall process efficiency.

Advanced VPSA cycles employ powerful adsorbents with a relatively short cycle, and the blow-down losses and top head oxygen purge losses can become quite large.

The use of advanced adsorbents and cycles drives VPSA process design towards reduced bed length. The advanced adsorbents typically can operate efficiently with a lower transfer length, hence a vessel design that readily accommodates this feature is attractive. The use of shorter bed lengths with axial vessels is possible, but when large size plants are desired, the diameter of the vessel becomes prohibitively large.

In the modern PSA technology due to increased demand for higher product throughputs, the ratio of bed length to bed frontal area becomes smaller and adsorbent beds go through faster cycles. For the case of a radial bed, increasing the bed height relative to bed length, in this way making the bed taller, is one way to achieve higher product flow. Nowadays, the beds are also being designed with little end space to minimize the unit cost and to increase the efficiency. In such challenging conditions, uniform flow distribution in the adsorbent bed is essential for optimum bed performance since it allows the use of all available separation surfaces in the vessel.

Adsorption vessels are used to capture and reduce the contaminants of chemical components such as carbon dioxide, carbon monoxide, nitrogen, oxygen, water, and hydrocarbons of the feed stream to ppm levels. This is carried out by adsorbing gases on different adsorbents such as alumina, carbon, zeolite, and molecular sieves. The adsorbent is contained in vessel and is alternated between adsorption and purge steps. A vessel has generally the bed at the middle of the vessel, and has two distributors, one on the feed side of the bed and the other on the product side of the bed. Flow maldistribution in adsorption vessels can cause early breakthrough, loss of efficiency, sieve movement and local bed fluidzation. To prevent these problems, uniform flow distribution in an adsorbent bed is essential.

U.S. Pat. No. 5,298,226 relates, in general, to apparatus for providing uniform fluid flow in vessels having packing materials or particulates and, in particular, to apparatus for providing uniform gas flow in pressure swing adsorption vessels.

U.S. Pat. No. 5,759,242 relates to a vessel for use in a pressure swing adsorption gas separation process includes an enclosing wall which defines an enclosed space having a top region and a bottom region. An annular adsorbent bed is positioned within the enclosed space and has a porous outer wall, a porous inner wall and adsorbent material positioned between the walls. The porous outer wall is separated from the enclosing wall to create a gas feed channel therebetween, and the porous inner wall surrounds an inner tank whose wall surface is separated from the porous inner wall and creates a product flow channel therebetween. A gas feed/distribution baffle structure is positioned in the bottom region of the vessel and in fluid communication with the gas feed channel to provide a gas feed thereto. The gas feed enters the gas feed channel and the adsorbent bed via the porous outer wall and in a direction generally radially towards the inner porous wall and product flow channel. A product outlet is positioned in the bottom region and in fluid communication with the product flow channel, for collecting product gas passing thereinto via the porous inner wall from the adsorbent bed. A flexible membrane extends between the porous outer wall and the porous inner wall, at the upper extremities thereof, and is pressurized so as to bear upon the upper surface of the adsorbent material to prevent fluidization during the flow.

U.S. Pat. No. 5,716,427 relates to equipment, for example of the PSA type, comprising gas circulation elements for passing the gas horizontally through an adsorbent, which comprise, on at least one vertical side of the adsorbent, a gas distribution volume comprising a first subvolume adjacent to the adsorbent, and a second subvolume separated from the first subvolume by a wall provided with passages having cross-sections and/or a distribution which are selected so as to reduce the variations in a local flow rate along the adsorbent. The equipment is particularly useful in separating gases from air.

U.S. Pat. No. 5,814,129 relates to apparatus and method to improve flow of fluid through an annular bed in a radial flow treatment vessel. An elongated annular baffle is disposed in the reactor adjacent the bed to impart generally U-shaped flow to the fluid either prior to entering or after it exits the bed thus achieving an overall serpentine or reverse U-shaped flow pattern as the fluid proceeds from an entry port to an exit port in the reactor. Means are provided in the baffle to permit minor amounts of fluid to bypass the generally U-shaped flow path in order to correct fluid flow maldistribution through the bed that is attributed to frictional pressure drop in the flow channels adjacent to the bed. A vessel can be operated with fluid flow through the vessel in either direction.

U.S. Pat. No. 4,374,094 relates to a radial flow catalytic reactor in which a gravity supported centerpipe is restrained from vertical upward movement due to thermal cycling of the catalyst and the reactor internals by forming the centerpipe to have uniform vertical and radial permeability in a frustoconical configuration. Gravity effect of the catalyst particles forming the bed act along the tapered side of the centerpipe. Additionally improved permeability to radial flow through the uniformly packed catalyst bed, independently of radial resistance to flow through the reactor due to pressure gradient between top and bottom of the vessel is achieved by compensation for differences in radial distance to the centerpipe from the upper portion to the lower portion of the catalyst bed by changes in the permeability of the tapered conical surface of the centerpipe. Uniformity of radial flow through the catalyst bed is assured by forming the conical portion of the centerpipe from rigid screen material so that reaction "dead" spots do not develop adjacent to the centerpipe.

There is a genuine need to find a better way to engender a uniform velocity across the entire section of the process vessels having packing materials or particles. The enhancement of fluid distribution, i.e., improved uniformity, allows for the use of all the available reaction or separation surface area in the process vessels, thereby efficiently increasing the yield of the desired product.

It is an object of the invention to provide an improved radial bed adsorbent vessel capable of achieving an effective uniform flow of gas through the adsorbent bed therein.

It is another object of the invention to provide an improved VPSA vessel capable of achieving substantial uniform velocity of gas through the bed of the vessel.

With these and other objects in mind, the invention is hereinafter described in detail, the novel features thereof being particularly pointed out in the appended claims.

SUMMARY OF THE INVENTION

The present invention relates to a vessel for use in a pressure swing adsorption gas separation comprising a generally cylindrical elongated outer shell having first and second ends closed by end plates, at least one annular shaped bed containing particulate material disposed longitudinally between the outer shell and the central axis of the shell providing an outer passage between the shell and the outer peripheral surface of the bed with an inner passage between the inner peripheral surface of the bed and an annular elongated wall disposed at the central area of the shell, means adapted for introducing a gas into the vessel to pass through said bed and then removing the gas after passing through the bed, the improvement comprising a perforated annular distributor adjacent the outer peripheral surface of the bed and said distributor having a minority of its longitudinal length with an open area of between about 1% and 10% and the remaining longitudinal length with an open area great than 10% up to about 50%. Preferably, the outer passage is non-uniform and preferably it could be conical in shape with the apex away from the gas entry.

In the preferred embodiment of the present invention, the perforated annular distributor adjacent the outer peripheral surface of the bed is a perforated annular distributor having its bottom longitudinal length between about 20% to about 40% of the distributor length with an open area of between about 1.5% and about 4%, its middle longitudinal length between about 30% to 70% of the distributor length with an open area of between about 8% and about 15% and its top longitudinal length between about 60% to 100% of the distributor length with an open area of between about 40% and about 50%. More preferably, the bottom longitudinal length can be about 30% to 38% with an open area between about 2% and about 3%, the middle longitudinal length between about 35% to about 65% with an open area between about 9% and 13% and the top longitudinal length between about 68% to 100% with an open area of between about 40% and 48%. Preferably, the bed sections for each particle size should be at 10% of the bed heights.

A flow distribution problem in prior art radial beds is generally solved by using conical section for the inlet or outlet volume. In many instances this solution will provide a flow field with little or no maldistribution. Even though perforated plate is present at the inner and outer periphery of the bed, it acts as a bed support rather than a flow distribution apparatus. According to applicants' simulations, in a typical tall (~200 inches) radial bed with uniform porosity perforated plate, using a tapered conical inlet section yields a flow maldistribution of 10–15% as opposed to 20–25% flow maldistribution obtained with a constant diameter annular inlet section.

As the operational conditions and bed geometries become more challenging, simple conical (inlet or outlet) subvolumes will not be sufficient to provide uniform flow into the bed. One of the most important geometric limits here is the vessel height. For example, according to applicants' simulations, in a tapered conical inlet radial bed with 100-inch bed height, 11.5-feet bed OD and 12.5-feet vessel OD, flow maldistribution is just 2–3%. However, same size and geometry vessel with 200-inch bed height yields a flow maldistribution of 10–15%.

With the above simulated examples, it is fair to say that conical inlet section is enough to provide uniform flow into the short beds but other flow distribution means are required for tall beds. One way to improve the flow distribution in tall beds is to increase the size of the tapered conical inlet. This would allow the incoming fluid to enter the bed more evenly by transferring more fluid to upper section of the bed. However, increasing the size of the inlet cone would increase the overall void volume, which would effectively degrade the process efficiency and increase the unit cost.

Modifying the porosity in the perforated plate in accordance with this invention, can correct the flow maldistribution is a simple and viable solution to the above problem. Implementing a variable porosity perforated plate to the conical inlet section as a flow distributor further decrease the flow maldistribution to 3–7% range for aforementioned for the tall bed geometry. Only modifying the perforated plate, which is already available in the vessel without making any other modifications, minimizes the associated costs of solving the problem. In addition, this modification does not increase the void volume or overall pressure drop in the bed. Hence, it is not necessary to sacrifice process efficiency or plant capacity to make this modification, rather we will get the benefits of increased efficiency and capacity due to uniform flow.

BRIEF DESCRIPTION OF THE DRAWINGS

FIG. 1 shows a packed bed 2 that forms a thick annulus cylinder 4 and its inner and outer surfaces are covered by mesh-screen 6 and perforated plate 8 along the entire bed height. During the feed step, fluid enters the tapered inlet cone from the bottom, and enters into the bed from its outer surface 10, then it travels through the bed. As the bed adsorbs the impurities, product leaves the bed from its inner surface and exits through the center of pipe 12. During purging and repressurization, flow direction reverses, fluid enters the bed from center pipe and leaves from tapered cone section. But regardless of the flow direction, fluid flow follows an inverted U-pattern while flowing in and out of vessel. Due to apparent flow pattern, the bottom of the bed is subjected to higher fluid velocities in tall radial beds. At this point, it is important to define tall radial beds such that in typical radial beds, the ratio of bed height to radial bed length is in the range of 1 to 3, but as this ratio reaches around 5, the bed becomes tall.

The novelty of this invention is to correct the flow maldistribution in tall radial beds by designing a distributor which enforces higher-pressure drop in the bed section where it receives more flow (in this case, bottom of the bed), and places little or no resistance in sections where it receives less fluid flow (at the top of the bed). By doing so, the distributor promotes fluid flow in usually slow flowing top layers of the bed and demotes the flowrates at the bottom layers of the bed. In this way, it enhances the even and effective distribution of fluid along the bed height.

Velocity profile along the bed height reveals an almost linear decrease in velocity magnitude from bottom to top of the bed. To encounter such non-uniform flowrates in the bed, a variable porosity perforated plate can be placed at the bed periphery. The porosity can be adjusted in such a way that the percentage open area in the perforated plate increases from bottom to top of the bed continuously, or in several discrete sections, and hence it corrects flow maldistribution. Exact variation pattern and rate of change of porosity depend on specific operation conditions and the range flow rates.

In the preferable embodiment of the invention, the distributor is a thin (~⅜" thick) perforated plate and covers the outer (and/or inner) surface of the annular bed. Preferably it has three discrete sections of perforations with different percentage of open areas.

Figure 1:
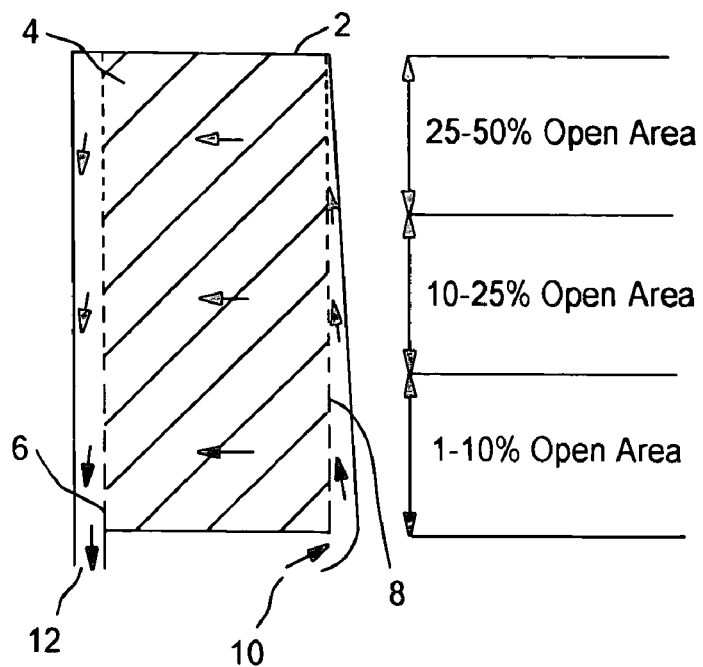
FIG. 1 is a schematic of a radial bed with a flow distribution in accordance with the invention.
Figure 2:
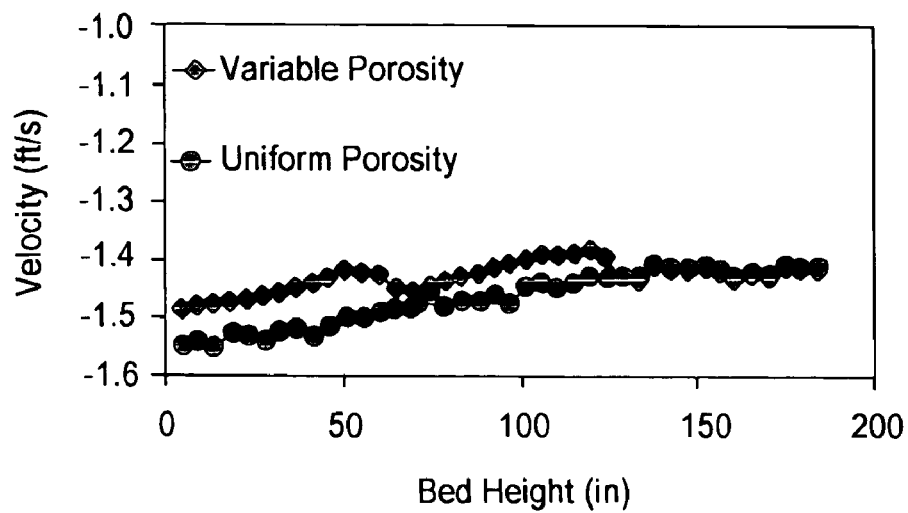
FIG. 2 is a plot of the velocity versus the bed height for a variable porosity and a uniform porosity.

For the case of three perforation sections, bottom, middle and top, the percentage of open area in these sections are varied such that middle section has more open area than the bottom, but less than the top section. The improvement on flow distribution in a radial bed using a novel variable porosity flow distributor can be seen in FIG. 2. Flow maldistribution of 10% with uniform porosity perforated plate is reduced to 3% with variable porosity perforated plate. In this typical example, the open area perforations in the plate are 2% in the bottom one-third, 10% in the middle and 48% at the top one-third.

Porosity, or in other words percentage open area, of perforated plate is factor of density and sizes of the opening on the plate. The density, or number of opening, is determined by pitch, the center to center distance between the neighboring openings. Increasing the pitch increases the distance between the consecutive openings, and hence decreases the open area. The size of each hole is characterized by diameter of the opening, larger the opening size larger the open area. Percentage open area increases with increasing specific diameter and decreasing pitch. In a perforated plate with fixed diameter size, changing the pitch alters the percentage open area. For the distributor described above, the space between the openings on the middle section is greater than the top section but is less than the bottom section.

Preferably the perforations on the plate are made of punched circular round holes, and they are on a uniform triangular pitch. The distance between the openings, pitch, having a diameter of 0.5 inch, is 3.375 inches for the bottom section, 1.05 inches for the middle section and $^{11}/_{16}$ inch for the top section to provide the aforementioned preferred percentage openings.

The best mode to practice the invention is that the distributor is designed for a bed packed with spherical particles having an average diameter of 1.6 mm and void volume (porosity) of 37%.

The flow distributor can have multiple sections such as at least two with preferably three discrete sections of perforations with different percentage of open areas. It can also have four, five, or practically any number of sections, as long as each section has more percentage open area than the one below it and less percentage open area than the one above it. For the ultimate case, the perforations can increase from bottom to top continuously.

For the case of three perforation sections, bottom, middle and top, the percentage of open area in these sections are varied such that middle section has more open area than the bottom, but less than the top section. Preferably, the total open area of the bottom one-third of the distributor is about 0–20%, the total open area of the middle one-third is about 2–60%, and the total open area of the top one-third is about 4–100%. However, ideally the perforations in the bottom one-third of the bed height should be in the range of 1–10% open area, middle one-third should be in the range 10–25%, and the top one-third should be in the range of 25–50% open area.

Perforations on the plate are preferably made of punched round although other shapes such as square, triangle or rectangle holes can be employed. However, circular holes are preferable since there would be no sharp corners on the perforated plate, which may act as a stress raiser, since plate itself carries a certain level of loading. Perforation patterns of holes can be on a triangular or square pitch. Regardless, it is preferable to have uniform pattern in each section to enhance the uniform flow distribution. Round openings can have diameter in the range of 0.05 inch to about 1 inch, but preferably should be in the range of 0.25 inch to 0.75 inch.

The distance between the openings, the pitch, is in the range of about 0.05 inch to 15 inches. In the meantime, geometric limit for the pitch is to be less or equal to the diameter of the opening. However, physical limit is much smaller, since there needs to be solid material between the peripheries of openings. For example, for the case of 0.5 inch diameter opening size, the pitch would be in the 1.5 inches to 5.0 inches range for the bottom section, 0.9 inch to 1.5 inches range for the middle section and 0.6 inch to 0.9 inch range for the top section to provide the aforementioned preferred percentage openings.

Basically, the flow entering in and exiting out of the beds follows an inverted U-pattern, since inlet and outlet ports are on the bottom of the bed for the current bed geometry. However, this invention is also applicable for a U-pattern, where both inlet and outlet manifolds are on the top of the bed. Additionally, this invention is applicable for Z-shaped flow pattern, where inlet manifold is on the bottom and outlet manifold is on the top of the bed, or vice versa. For schemes involving non "inverted U-patterns", the distributor cross-section geometry will have to be appropriately redesigned.

The concept of the distributor can be extended to bed packed with particles of any shape, size, and porosity.

The underlying issue in designing such distributor is to take the pressure drop in the bed into consideration. Depending on the size of the particles packed in the bed, there will be different level of pressure drop along the bed length. Not only the percentage open area, but the combination of pressure drop provided by both perforations and bed itself determines the performance of flow distributor. Placing a perforated plate section that is producing excessive pressure drop is undesirable, as well as a distributor creating a very small pressure drop would be also unsatisfactory to enhance flow distribution. As an example, for the packed with particles having average size of 1.6 mm, the percentage open area of perforations should be around 1–5% to provide comparable pressure drop as the bed. Additional pressure drop provided by perforated plate would be effective only if it becomes comparable with bed pressure drop. If different porosity and size particles are packed in the bed than the ones specified above, the percentage open area in the sections of distributor might be considerably different than specified above. However, the concept of increasing the percentage open area from bottom to top continuously or in sections is conserved.

Flowrates are much higher and the flow distribution is more critical during the feed step. For this reason, flow distributor should be placed at the outer periphery (feed side) of the radial bed. However, it is also preferable to have flow distributor at the inner periphery (product side) of the bed for better flow distribution during purge step. Placing symmetrical geometry of flow distributors on both inner and outer peripheries of the bed provides more uniform flow distribution at all steps of the process.

Figure 3:
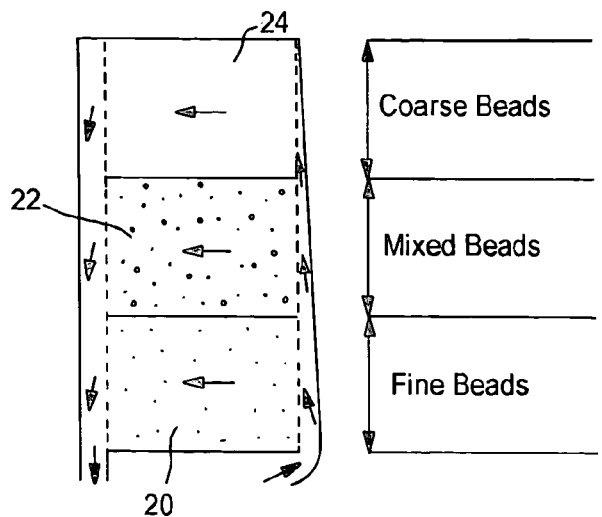
FIG. 3 is a schematic of an enhanced flow distribution with different size layering.

Using different porosity layers (axial layering) in the bed to account for different pressure gradient is another way to improve flow distribution in the tall radial beds. This bed geometry is depicted in FIG. 3. Due to apparent inverted U-flow pattern for the radial bed, relatively higher velocities (high-pressure gradient) are present at the bottom of the bed as compared to top of the bed. To counter balance such non-uniform velocity profile, pressure drop at the bottom of the bed can also be increased by layering relatively finer particles 20 in this section followed by mixed particles 22. Similarly, layering coarser particles 24 at the top layers of the bed provides relatively less pressure drop at the top of the bed. Higher flow resistance (pressure drop) due to finer particles 20 at the bottom of the bed forces more fluid to flow towards top layers at the bed entrance, and eventually this enhances the flow distribution in the bed. To prevent the deterioration of the bed, average particle size should increase smoothly and continuously from bottom to top of the bed.

Figure 4A:
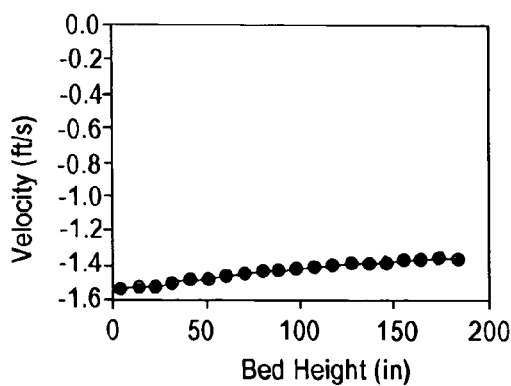
FIG. 4a is a plot of the velocity versus bed height for a bed packed with fine particles.
Figure 4B:
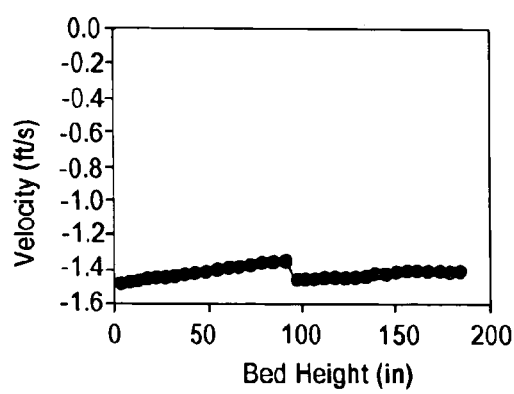
FIG. 4b is a plot of the velocity versus bed height for a bed packed with fine particles at its bottom half and coarse particles at its top half.
Figure 4C:
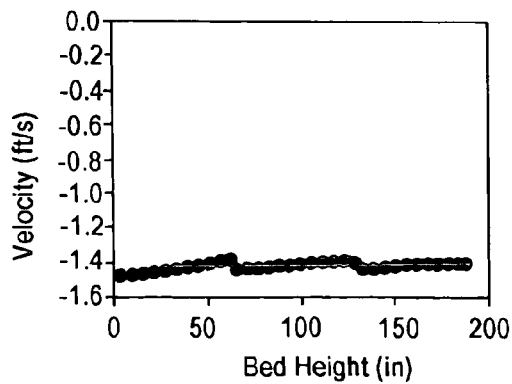
FIG. 4c is a plot of the velocity versus bed height for a bed packed with a three-layer arrangement of fine, mixed and coarse particles.

Enhancing flow distribution with different particle-size layering is shown in FIGS. 4a to 4c. Velocity profile of the fluid entering into the bed in the radial direction for the feed step is shown in the FIGS. 4a to 4c for different bed geometries. In FIG. 4a, whole bed is packed with identical fine particles, and this yield 12% flow maldistribution in the velocity profile. FIG. 4b shows when bottom half of the bed is packed with fine and top half is packed with coarse particles and this configuration yields 9% flow maldistribution. Finally, FIG. 4c shows only 6% flow maldistribution for a bed with three layers of packing with fine, mixed and coarse particles, each taking one-third of the bed just as shown in FIG. 3.

Another embodiment of the invention is to utilize the fundamental of flow distributor to solve the flow problems observed in disrupted radial beds. The top of radial bed is constrained by the pressurized bladder assembly to assure dense packing of the adsorbent bed at all times of the operation. Uniform dense packing throughout the entire bed is crucial for the radial bed to have good flow distribution and hence to operate at required performance level. However, the top section of the radial bed may end up having less packing density as compared to the rest of bed due to uneven loading or due to human access to the top of bed during bladder installation or inspection. The disruption of top layer eventually leads to drop in bed capacity even though it is limited to top 3 inches to 6 inches of adsorbent bed. Pressure drop in the disrupted section of the bed will be less than the rest of the packed bed since effective packing density will be lower in this section, and this is the underlying reason for flow maldistribution in the disrupted packed beds.

Figure 5A:
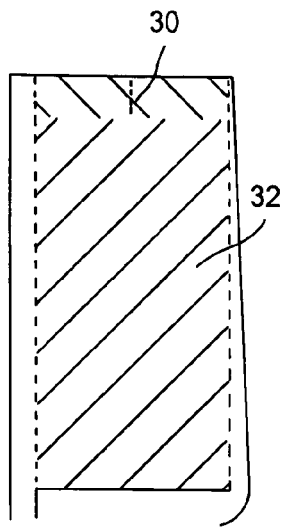
FIG. 5a is a schematic of a radial bed having perforated plate embedded within the bed.

To correct this problem, the pressure drop can be increased by artificial means in the disrupted section to minimize the flow maldistribution along fluid flow planes. One of the possible ways is to insert perforated plate (baffle) into the disrupted section of the bed to increase pressure drop. Since this configuration is designed for radial beds, perforated plate forms a circular ring. The typical depth of the disrupted section determines the height of the ring. Preferably, flat plates could be welded on a perpendicular plane to the top of the perforated plates to prevent it from moving downward into the bed. The cross-section of this configuration makes a T-shape 30 as shown in the FIG. 5a. Alternatively, multiples (two, three, etc.) of this configuration can be installed into the bed 32 to provide addition and/or more homogeneous pressure drop within the disrupted section. The upper flat plate of the assembly that is to be welded to the perforated plate, also serves as platforms for workers who may need to access the top of the bed or bladder to perform necessary maintenance work or inspections.

Figure 5B:
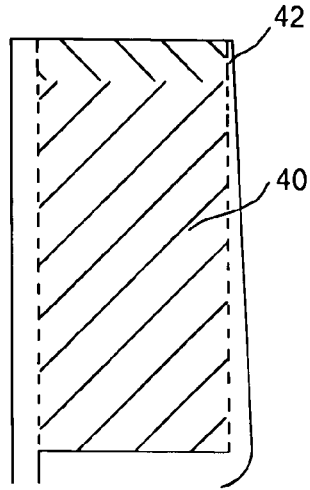
FIG. 5b is a schematic of a radial bed having modified perforated plate at the peripheries of the bed.

Another possible solution to this problem is to modify the percent open area in the inner and outer sections perforated plate that coincides with the disrupted portion of the bed. As shown in FIG. 5b, this option is much easier to manufacture and relatively inexpensive compared to other solutions. Radial bed 40 typically has a variably perforated plate with that covers inner (product side) and outer (feed side) surfaces of the bed. Decreasing the percentage open area of the perforated plate 42 to 5–10% in the disrupted section increases the pressure drop and this eventually enhances flow distribution in the bed.

Figure 5C:
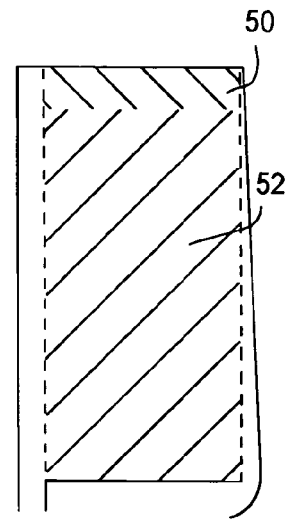
FIG. 5c is a schematic of a radial bed having finer particles at its top layered section.

Another viable solution to this problem is axially layering finer particles 50 at the top layers to provide additional resistance in disrupted top layers to improve flow distribution in the radial bed 52 as shown in FIG. 5c. In all of these embodiments, the fundamental idea is to compensate the decrease in flow resistance of top layers due to increased void volume by increasing the flow resistance using other means, such as smaller particle size or perforated plate. A combination of all or some of these methods is also a possibility to enhance the flow depending on the geometry, operational conditions and particle size.

Figure 6:
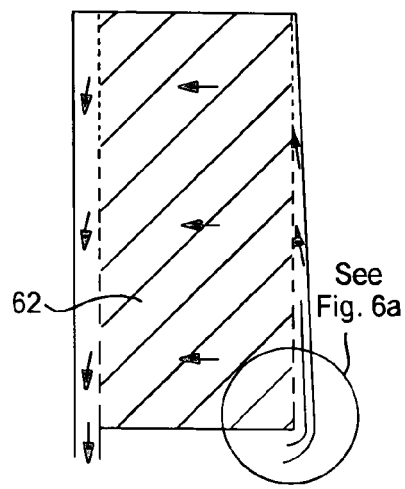
FIG. 6 is a schematic of a radial bed with flow dividing baffles.
Figure 6A:
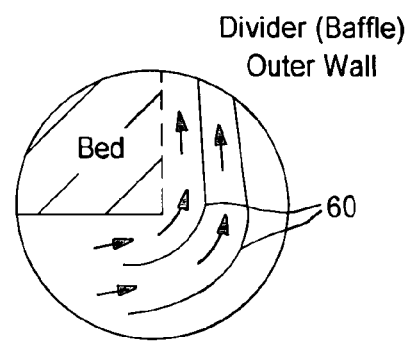
FIG. 6a is an enlarged view of the flow dividing baffles of FIG. 6.

As shown in FIG. 6 and FIG. 6a, another way to improve the flow distribution in radial beds is to use guiding baffle 60 in the inlet cone to direct the incoming flow evenly towards the bed 62 entrance. Due to space limitation, a single baffle is preferred, however multiple baffles improve the flow distribution better. Baffles should extend from inlet subvolumes towards the bed entrance by dividing the flow area into equal spaces so that each section receives equal flowrates.

The invention provides a significant advance in the field of PSA and other adsorption processing for commercially significant air and other gas separation operations. By conveniently enabling more uniform gas flow across the adsorbent bed to be achieved, the invention enables the full adsorptive capacity of the adsorbent bed to be effectively utilized. Large void volume and/or pressure drop requirements in the vessel head are thereby mitigated, and enhanced overall performance of the highly desirable adsorption processes is advantageously in practical commercial operations.

Although the distributor components and their arrangement in a fixed bed vessel have been described in detail in reference to certain embodiments, those skilled in the art will recognize that there are other embodiments of the invention within the spirit and scope of the claims.

What is claimed:

1. A vessel for use in pressure swing adsorption gas separation comprising a generally cylindrical elongated outer shell having first and second ends closed by end plates, at least one annular shaped bed containing particulate material disposed longitudinally between the outer shell and the central axis of the shell providing an outer passage between the shell and the outer peripheral surface of the bed with an inner passage between the inner peripheral surface of the bed and an annular elongated wall disposed at the central area of the shell, means adapted for introducing a gas into the vessel to pass through said bed and then removing the gas after passing through the bed, the improvement comprising a perforated annular distributor adjacent to at least one peripheral surface of the bed and said flow distributor having a variable perforation geometry pattern, wherein the perforated distributor is annular shaped and comprises at least two sections with each section having a different perforation size.

2. The vessel of claim 1 wherein outer passage is non-uniform and conical in shape with the apex away from the gas entry section of the vessel.

3. The vessel of claim 1, wherein the perforated distributor has three sections.

4. The vessel of claim 1, wherein the shape of the perforation are selected from the group consisting of circles, squares, triangles, rectangles and combination thereof.

5. The vessel of claim 4 wherein the shape of the perforations are circles, the flow distributor has three longitudinal sections with a first section having an open area of between about 1% and about 10%, a second section having an open area of between about 10% and 25% and a third section having an open area of between about 25% and 50%.

6. The vessel of claim 5 wherein the three sections have the same longitudinal length.

7. The vessel of claim 1 wherein the particulate material of the bed is uniform.

8. The vessel of claim 1 wherein the particulate material varies from fine particles at one longitudinal section to coarse particles at the opposite longitudinal section.

9. The vessel of claim 8 wherein the finer particles are at the bottom section and coarser particles are at the opposite end.

10. The vessel of claim 8 wherein the shape of the perforations are circles, the flow distributor has three longitudinal sections with a first section having an open area of between about 1% and about 10%, a second section having an open area of between about 10% and 25% and a third section having an open area of between about 25% and 50%.

11. The vessel of claim 8 wherein the bed section for each particle size is at least 10% of the bed length.

12. The vessel of claim 8 wherein the three sections have the same longitudinal length.

13. The vessel of claim 1 wherein the peripheral longitudinal top section contains an open area smaller than the open area of the remaining longitudinal length of the flow adsorber.

14. The vessel of claim 13 wherein the shape of the perforations are circles, the flow distributor has three longitudinal sections with a first section having an open area of between about 1% and about 10%, a second section having an open area of between about 10% and 25% and a third section having an open area of between about 25% and 50%.

15. The vessel of claim 14 wherein the three sections have the same longitudinal length.

16. The vessel of claim 1 wherein the bottom volume section of the particulate material of the bed comprises finer particles as compared to particles above said bottom volume section that contains coarse particles.

17. The vessel of claim 16 wherein the shape of the perforations are circles, the flow distributor has three longitudinal sections with a first section having an open area of between about 1% and about 10%, a second section having an open area of between about 10% and 25% and a third section having an open area of between about 25% and 50%.

18. The vessel of claim 1 wherein the flow distributor has an input end and has dividing baffle means at said input end.

19. The vessel of claim 18 wherein the shape of the perforations are circles, the flow distributor has three longitudinal sections with a first section having an open area of between about 1% and about 10%, a second section having an open area of between about 10% and 25% and a third section having an open area of between about 25% and 50%.

20. A vessel for use in pressure swing adsorption gas separation comprising a generally cylindrical elongated outer shell having first and second ends closed by end plates, at least one annular shaped bed containing particulate material disposed longitudinally between the outer shell and the central axis of the shell providing an outer passage between the shell and the outer peripheral surface of the bed with an inner passage between the inner peripheral surface of the bed and an annular elongated wall disposed at the central area of the shell, means adapted for introducing a gas into the vessel to pass through said bed and then removing the gas after passing through the bed, the improvement comprising a perforated annular distributor adjacent to at least one peripheral surface of the bed and said flow distributor having a variable perforation geometry pattern, wherein at least one perforated plate is embedded within the top section of the particulate material.

21. The vessel of claim 20 wherein the perforated plate is in the shape of a T with the horizontal section of the plate being flushed with the top surface of the particulate material.

22. The vessel of claim 21 wherein the shape of the perforations are circles, the flow distributor has three longitudinal sections with a first section having an open area of between about 1% and about 10%, a second section having an open area of between about 10% and 25% and a third section having an open area of between about 25% and 50%.

* * * * *